(No Model.)  3 Sheets—Sheet 1.

C. SCHILLER.
APPARATUS FOR TREATING OFFAL.

No. 287,967.  Patented Nov. 6, 1883.

(No Model.)  3 Sheets—Sheet 2.

C. SCHILLER.
APPARATUS FOR TREATING OFFAL.

No. 287,967. Patented Nov. 6, 1883.

Attest:
Edmund Brodhag
W. C. Chaffee

Inventor:
Charles Schiller,
by Johnson & Johnson
Attys (No Model.) 3 Sheets—Sheet 3.

C. SCHILLER.
APPARATUS FOR TREATING OFFAL.

No. 287,967. Patented Nov. 6, 1883.

Attest:
Edmund Budhag
W. C. Chaffee

Inventor.
Charles Schiller,
by Johnson and Johnson
Attys

UNITED STATES PATENT OFFICE.

CHARLES SCHILLER, OF BALTIMORE, MARYLAND.

APPARATUS FOR TREATING OFFAL.

SPECIFICATION forming part of Letters Patent No. 287,967, dated November 6, 1883.

Application filed June 5, 1883. (No model.)

*To all whom it may concern:*

Be it known that I, CHARLES SCHILLER, a citizen of the United States, residing at Baltimore city, in the State of Maryland, have invented new and useful Improvements in Apparatus for Treating Offal, of which the following is a specification.

My invention is directed to improvements in apparatus for treating the offal of slaughter-houses, and comprehends an apparatus in which the animal matter is cooked to extract the oil therefrom, and to dry and grind the solid matter, the products being utilized as a lubricant and as a fertilizer, these operations being effected in one and the same apparatus, and under a continuous treatment, in which the operations of rendering and drawing off the water and oil are succeeded by the operation of dehydrating and grinding the matter.

Hitherto in apparatus for the treatment of offal the reduction of the solid matter to a condition for use as a fertilizer has been effected after it has been removed from the rendering-vessel, and the operation has thereby been rendered more expensive and less rapid. In the provision of means for grinding the solid matter during the operation of drying it, and within the drying-chamber, the important advantages of rapidity and efficiency in the work are obtained. A jacketed cylinder forms the treating-vessel, within which the operations are carried on with water and steam, and which is adapted for being rotated in the operation of drying and grinding under heat only, the solid matter being by such rotation continuously delivered into suitable grinding-rolls mounted upon a non-revolving shaft, and having a fixed position within the vessel, so that the dried product is delivered from the apparatus in condition for use.

Figure 1:
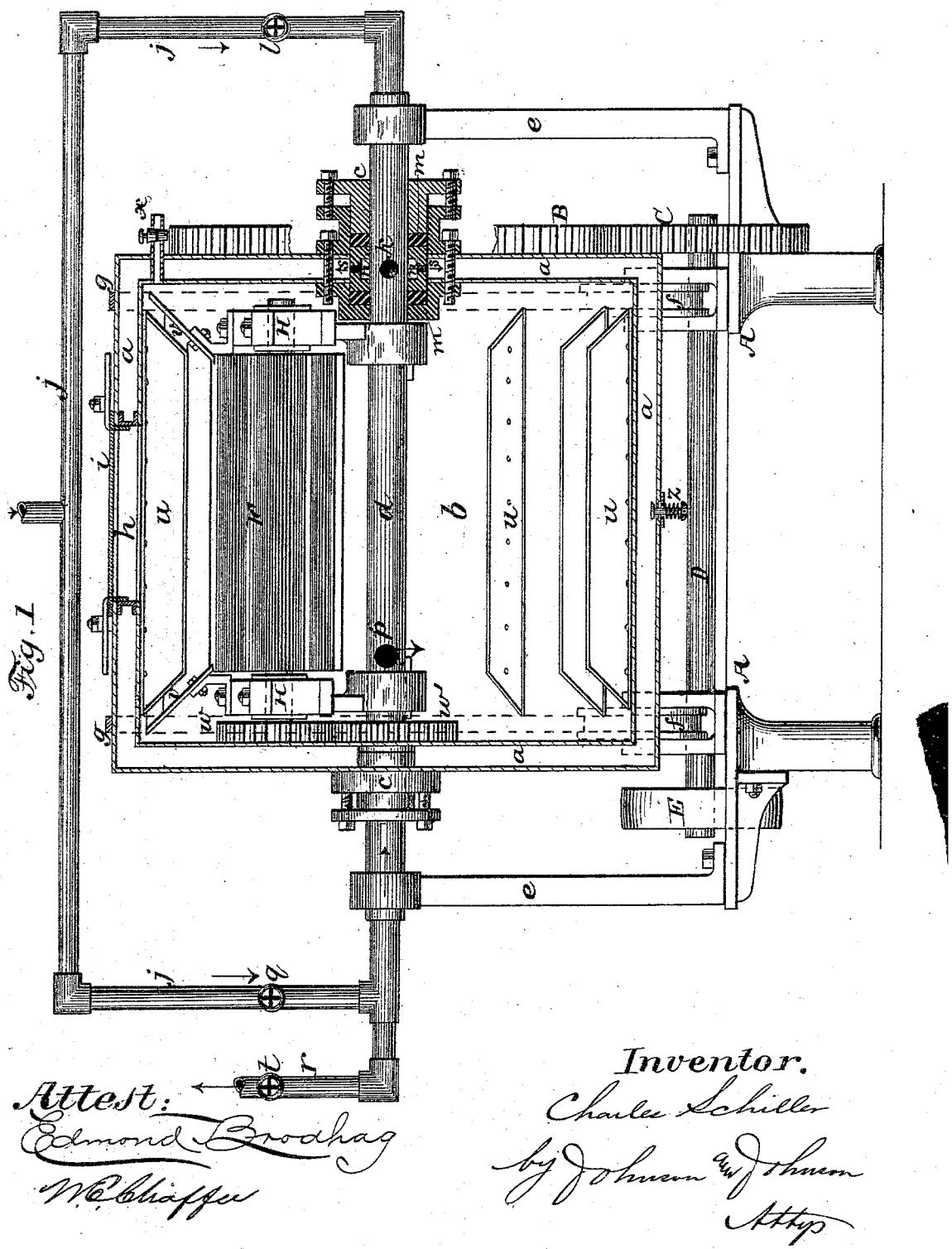
Figure 2:
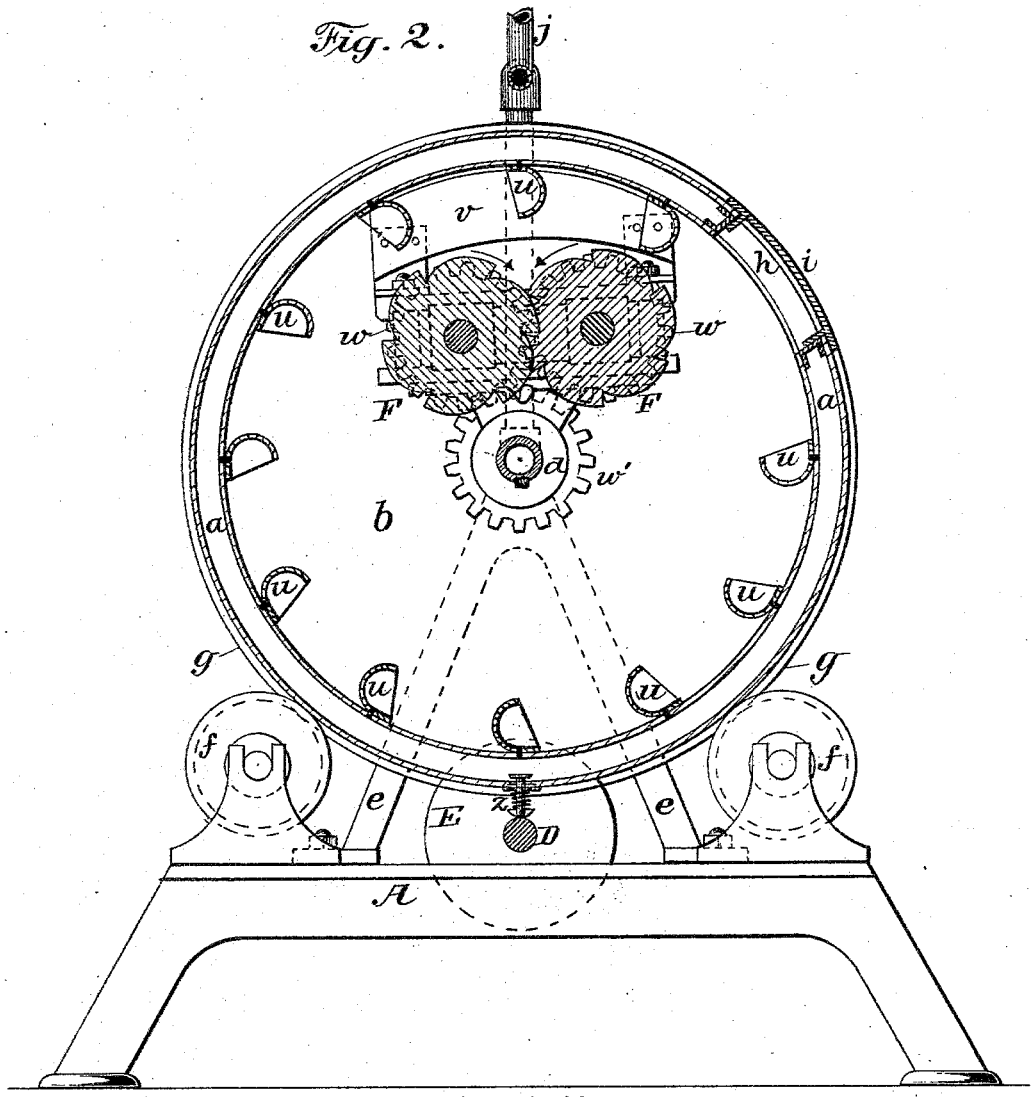
Figure 5:
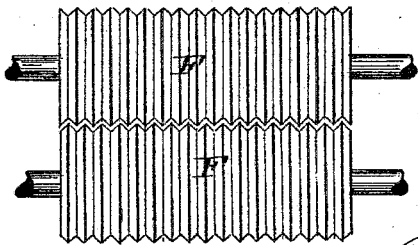
Figure 3:
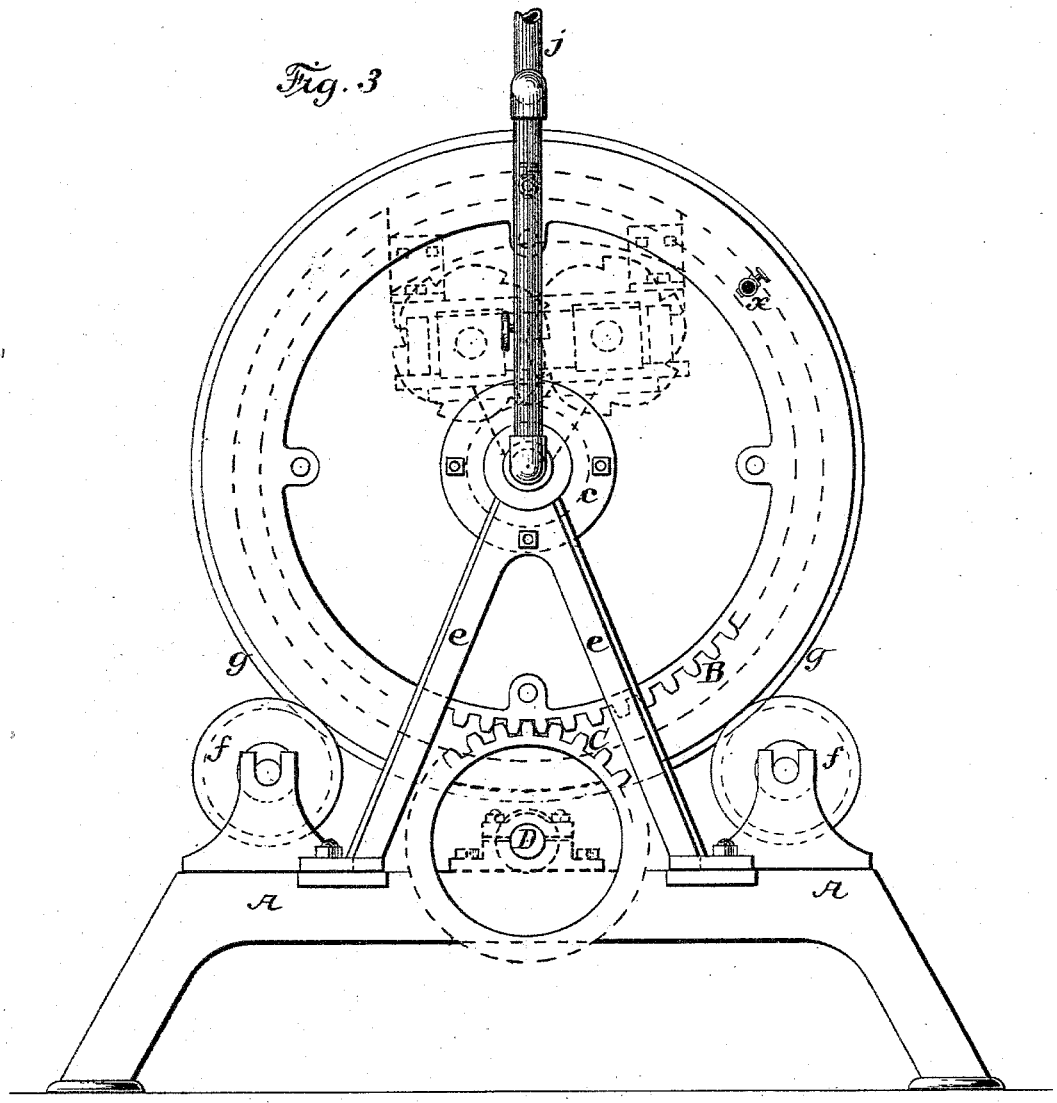
Figure 4:
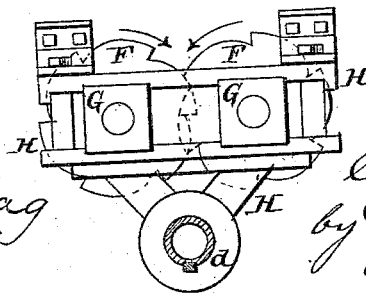

Referring to the accompanying drawings, which illustrate my improved apparatus for treating offal, Figure 1 represents a vertical longitudinal section; Fig. 2, a transverse section; Fig. 3, an end elevation; Fig. 4, an end elevation of the grinding-rolls and their supporting-frame, and Fig. 5 a top view of the grinding-rolls.

A jacketed cylinder forms the vessel in which the offal is inclosed, and is heated by steam, the space formed by the jacket constituting the steam heating-chamber $a$, and the interior cylinder forms the treating-chamber $b$ for the matter. It is mounted so as to turn loosely, by suitable steam-tight boxes, $c$, upon a non-revolving shaft, $d$, which is mounted in standards $e\ e$ of a suitable frame. Both the jacket and the cylinder are of boiler-iron, and the vessel, when properly mounted upon the shaft, is supported upon four flanged rolls, $f$, suitably mounted upon the bed-frame A, and upon which the vessel is confined in proper relation to its shaft by circumferential ribs $g$ on the jacket, fitting between the flanges of the rolls. Upon these supporting-rolls $f$ the vessel is rotated during the operation of drying and grinding the matter, while the shaft not revolving forms the means of supporting the grinding device in a fixed relation to the cylinder, which is adapted to be rotated, as will be presently stated. The cylinder is provided with a man-hole, $h$, on its cylindrical part for the introduction and discharge of the solid matter, and a suitable man-hole cover, $i$, is provided with means for securing it when in place.

The shaft $d$ is hollow, or is so made at each end, and is connected also at each end with a steam-pipe, $j$, which communicates with the boiler. At one end the shaft communicates by an opening, $k$, with the space $a$, formed by the jacket, by which said space is supplied with steam to heat the cylinder, such supply being controlled by a cock, $l$. This communication is preferably made by a box in two sections, forming a space, $n$, between them, into which the shaft-opening $k$ opens. The sections of the box are clamped together between packing by caps $m$, and at the joining of the box-sections there are holes $s$, which open into the jacket-space $a$. At the other end of the shaft it communicates by an opening, $p$, with the chamber $b$ of the cylinder, to admit steam into said chamber, such supply being controlled by a cock, $q$, in the boiler-connecting pipe. This end of the shaft $d$ also communicates by the opening $p$ with a pipe, $r$, also provided with a cock, $t$, by which the steam and the air from the treating-chamber $b$ are allowed to pass off to a fire and be burned or to escape from a high chimney. As the steam-supply pipe $j$ has a fixed connection with the boiler (not shown) and a fixed connection with the shaft $d$, the latter therefore cannot revolve, and is thereby used as a support for the grinding device, which is mounted upon the shaft in position just above it, so that the vessel, being rotated, is caused to carry up and by suitable means turn the solid matter into the mill, whence it falls into the chamber below the mill, to be again carried up and delivered into it, and so on the operation is continued until the solid matter is sufficiently dried and reduced.

Any suitable grinding device may be used; but I prefer the rolls F, which may be formed with toothed, corrugated, or ribbed surfaces, suitable for grinding the solid offal matter of slaughtering-houses. These rolls are mounted in boxes G, which are secured in suitable frames, H, keyed fast upon the shaft, by which they are held in the upper part of the cylinder-chamber centrally over the shaft. These rolls will be operated by the rotation of the cylinder in a manner presently to be described. The means by which the material is carried up to the mill consists of buckets $u$, preferably of trough shape, riveted to the inner wall of the cylinder at suitable distances apart, parallel to the shaft, and of a length nearly equal to that of the cylinder, so that as the latter revolves the troughs will carry the material up and turn it out as they pass over the mill. An upwardly-inclined plate, $v$, is attached to the top of each end frame to direct the falling substance upon the rolls. The rolls are geared together at one end by spur-gear $w$, one of which engages with a spur-gear, $w'$, secured to the inner wall at the center of one end of the inner cylinder, so as to revolve with it, and thereby cause the rolls to revolve toward each other, so as to draw the substance between them and crush and grind it at the same time it is being dried within the drying-chamber, from which it is discharged in a merchantable condition as guano.

The offal is cooked in water, which is supplied through the man-hole, and steam is supplied to the cooking-chamber by the cock $q$, and also to the surrounding space $a$ by the cock $l$, the cylinder in this operation not being revolved. After the offal is cooked the oil and water are discharged through a cock, $x$, in the end of the boiler, which for this purpose is gradually turned so as to bring the cock downward, leaving a small quantity of the water in the chamber, to prevent the substance adhering to the cylinder in the subsequent operation of drying the cooked offal. The cock $x$ is then closed. Valve $q$ is then also closed to cut off steam from the treating-chamber, and valve $t$ is opened to allow the steam and gases to escape from the treating-chamber. The cylinder is then revolved, steam being kept in the jacket-space all the time, and the substance dried by external heat and ground at the same time. These two operations being conducted within the treating-chamber, the substance is rapidly and uniformly dried and delivered through the man-hole comparatively free from offensive odor. The operation is then continued as at first.

The cylinder is rotated by a gear-wheel, B, secured on the outside at one end, into which gears a pinion, C, on the end of a shaft, D, mounted in boxes on the base-frame beneath the cylinder, and driven by a pulley, E, from any suitable power.

Provision is made for letting out the water produced by the condensation of steam in the jacket-space by a spring-valve, $z$, placed in the circumference of the jacket, and adapted to be opened inwardly by being brought in contact with the shaft D at each revolution of the cylinder, the said shaft being centrally arranged, so as to be struck by said valve.

The state of the art shows that previous to my invention apparatus for rendering out the fat from animal matter with water, and in the manufacture of fertilizers from the residuum or "scrap" obtained in the rendering operation, was adapted for melting the solid particles of fat, and for treating the offal of slaughter-houses generally, to cook the substance with water, and to obtain the oil in the cooking operation under the action of steam and hot air in a closed vessel.

In the manufacture of fertilizers derived from the treatment of animal matters in a confined condition, when such treatment has only been with fatty solids and fleshy parts, it has also been proposed to disintegrate and reduce the scrap or residuum into a finely-pulverized fertilizer by the action of numerous arms, which act as agitators, and pulverizers carried by a shaft or drum revolved within the treating-chamber; but it is obvious that such operation of arms cannot reduce or grind bones and other hard or tough parts. When the offal of slaughter-houses generally, which includes the tough and bony parts, is treated, the residuum is dried and ground in a mill or pulverizing apparatus, as a separate and distinct operation, to convert it into a fertilizer. I propose by my invention to extract the fat and produce a fertilizer from offal, including the bony parts, by a continuous operation within a heated treating-chamber, from which the dried and ground substance is discharged in merchantable condition as a fertilizer, the bones being reduced with the fleshy parts by grinding between rolls or other suitable grinding device which receives and grinds the stuff, hard and soft, within the drying-chamber to a condition fit to be sold as a fertilizer; and, so far as I know and can find, the process of subjecting the bones, with the fleshy parts, to a heating or rendering operation and drying operation, and a reducing operation under pressure between grinding-surfaces, continuously in a closed vessel, has not hitherto been done.

I claim—

1. In apparatus for treating animal offal, the revoluble jacketed cylinder provided with a cock, $x$, in combination with a fixed hollow shaft having an opening, $p$, communicating with the treating-chamber $b$ at one end of the cylinder, and an opening, $k$, communicating with the jacket-space $a$ at the other end of the cylinder, and the valved pipes $j$ $r$, connected with each end of said fixed shaft, whereby the oil and water are drawn off, after the operation of rendering, through said cock $x$, by gradually turning said cylinder to bring the cock at a lower level, substantially as described, for the purpose specified.

2. The combination, in apparatus for treating animal offal, of the jacketed cylinder provided with interior wall-troughs and the cock $x$, and the fixed hollow shaft $d$, having communication with the steam-supply, the treating-chamber $b$, and the jacket-space $a$, with a grinding device mounted upon said fixed shaft within the treating-chamber, and means, substantially such as described, for rotating said cylinder, and operating thereby the grinding-rolls in the upper part of said chamber.

3. The combination, in apparatus for treating animal offal, of the jacketed cylinder provided with the cock $x$ and interior wall-troughs, $u$, and the fixed shaft $d$, having communication with the steam-supply, the treating-chamber and the jacket-space, with a grinding device consisting of the rolls mounted by suitable frames upon the fixed shaft in the upper part of said chamber, their operating-gear, and the gear for rotating the cylinder upon the fixed shaft, substantially as described, for the purpose specified.

4. The apparatus, substantially hereinbefore set forth, for the treating of animal offal, comprising a jacketed cylinder adapted to be revolved and heated, provided on its inner walls with troughs, and a cock communicating with the treating-chamber, a non-revolving shaft communicating with a steam-generator, the jacketed space of said cylinder, the treating-chamber, means, substantially such as described, for grinding the substance under pressure and friction, arranged upon a fixed support within the upper part of said treating-chamber, and means, substantially such as described, for rotating said cylinder and for operating the grinding device, as specified.

5. The combination, in apparatus for treating animal offal, of a jacketed cylinder adapted to be revolved and heated, and provided with interior wall troughs or buckets, with a suitable grinding device arranged upon a suitable fixed support within the upper part of the treating-chamber of said cylinder, whereby the substance, in the operation of being dried, is automatically carried up and delivered into the grinding device, substantially as described, for the purpose specified.

6. The combination, in apparatus for treating animal offal, of a jacketed cylinder adapted to be revolved and heated, and provided with interior wall troughs or buckets, with a suitable grinding device arranged upon a suitable fixed support within the upper part of the treating-chamber of said cylinder, means, substantially such as described, for operating said grinding device within and by the rotation of the cylinder, and means for supporting and operating the cylinder.

In testimony whereof I have hereunto set my hand in the presence of two subscribing witnesses.

C. SCHILLER.

Witnesses:
A. E. H. JOHNSON,
J. W. HAMILTON JOHNSON.